United States Patent [19]
Berkovich

[11] Patent Number: 6,157,311
[45] Date of Patent: Dec. 5, 2000

[54] PORTABLE ELECTRO-MAGNETIC RADIATION SENSOR WARNING DEVICE

[76] Inventor: Yossi Berkovich, P.O. B 2365, Kiryat Ono, Israel

[21] Appl. No.: 09/226,149

[22] Filed: Jan. 7, 1999

[51] Int. Cl.$^7$ .................................................. G08B 21/00
[52] U.S. Cl. ................. 340/688; 340/686.1; 340/870.02; 324/207.2; 250/231.11; 356/375
[58] Field of Search ................. 340/688, 686.1, 340/870.02, 870.27, 870.28, 870.29, 870.31; 324/207.11, 207.13, 207.2; 250/215, 231.11; 356/375

[56] References Cited

U.S. PATENT DOCUMENTS

| | | | |
|---|---|---|---|
| 3,573,773 | 4/1971 | O'Hanlon | 340/870.27 |
| 3,808,531 | 4/1974 | Levine et al. | 324/157 |
| 3,924,255 | 12/1975 | Mori | 340/688 |
| 4,107,661 | 8/1978 | Crosby | 340/688 |
| 4,300,548 | 11/1981 | Jones | 250/231.11 |
| 4,631,539 | 12/1986 | Sanders et al. | 340/870.29 |
| 4,680,704 | 7/1987 | Konicek et al. | 340/870.02 |
| 4,728,950 | 3/1988 | Hendrickson et al. | 340/870.31 |
| 5,013,154 | 5/1991 | Kominsky | 356/375 |
| 5,880,464 | 3/1999 | Vrionis | 250/230 |

*Primary Examiner*—Nina Tong
*Attorney, Agent, or Firm*—Akin, Gump. Strauss, Hauer & Feld, LLP

[57] ABSTRACT

A portable, compact, freestanding sensor housing is configured to be stably and removably affixed relative to a metering device having a movable indicator element. The housing includes a transmitter for emitting electro-magnetic radiation and a receiver for receiving electro-magnetic radiation. The transmitter and the receiver are positioned to define a reflective region within which an object will reflect electro-magnetic radiation emitted from the transmitter toward the receiver. A signal generator, in communication with the receiver, generates a signal indicating that the movable indicator element is located within the reflective region. A sensor warning device affixed relative to the metering device will thereby generate a signal when the movable indicator element is located within the reflective region.

1 Claim, 3 Drawing Sheets

LIGHT SENSOR
NO ENERGY SAVING VERSION
(CONTINUES OPERATION)

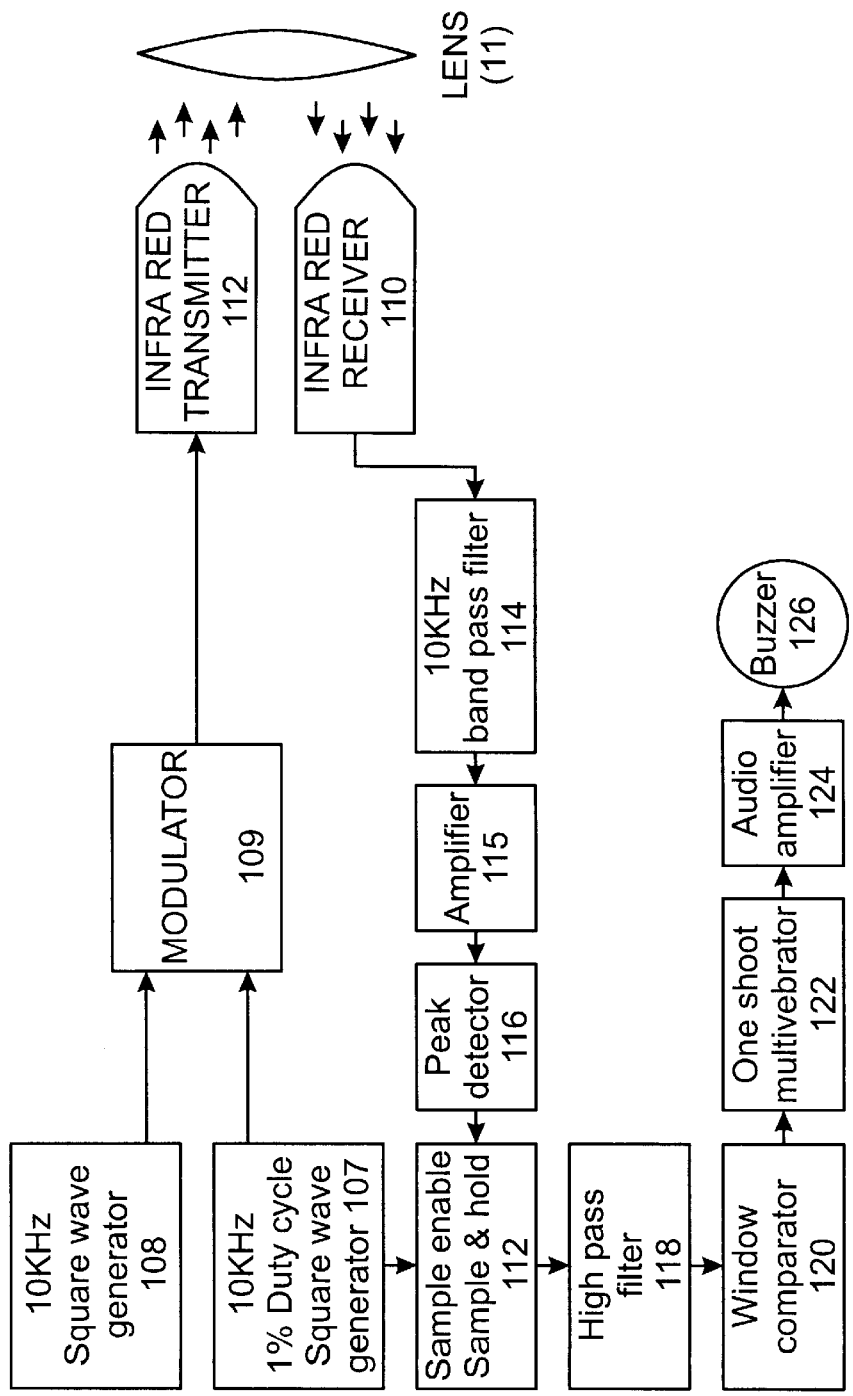

TOP VIEW
(SPEED LIMIT ALARM)

IN THIS APPLICATION,
AN ALARM WILL BE SOUND,
WHEN EVER THE SPEED POINTER
PASSES THE LIGHT SENSOR,
(110 Km/h IN THIS EXAMPLE)

PORTABLE ELECTRO-MAGNETIC RADIATION SENSOR WARNING DEVICE

FIELD OF THE INVENTION

The present invention generally relates to a portable electro-magnetic radiation sensor warning device.

BACKGROUND OF THE INVENTION

There is a pressing daily need for individuals and businesses to constantly adhere to diverse regulations, limits (such as speed limits) and directives imposed by personal, professional and legal standards. There is a need for users to easily, effectively and inexpensively monitor a wide variety of metering devices (such as speedometers) so that the user is made immediately aware that an established limit (such as a speed limit) has been exceeded.

SUMMARY OF THE INVENTION

In its preferred embodiment, the present invention is an electro-magnetic radiation sensor warning device comprising a number of elements in combination. A portable, compact, freestanding sensor housing is configured to be stably and removably affixed relative to a metering device having a movable indicator element. The housing includes a transmitter for emitting electro-magnetic radiation and a receiver for receiving electro-magnetic radiation. The transmitter and the receiver are positioned to define a reflective region within which an object will reflect electro-magnetic radiation emitted from the transmitter toward the receiver. A signal generator, in communication with the receiver, generates a signal indicating that the movable indicator element is located within the reflective region. A sensor warning device affixed relative to the metering device will thereby generate a signal when the movable indicator element is located within the reflective region.

The preferred embodiment of the present invention uses electro-magnetic radiation, although other types of radiation (acoustic radiation, for example) are also within the scope of the present invention.

The present invention was developed as an external, essentially independent device which can, almost instantaneously, be made adaptable and compatible for the servicing of individual, business and other needs, thus creating an immediate advantage for the user of such a device, as it can be used more than once and for more than one purpose.

The multi-purpose, highly sophisticated device is intended to provide users with a portable electro-magnetic radiation sensor warning device easily fixed by means of various techniques on diverse pieces of machinery or equipment. The present invention, in a preferred embodiment, may be designed to offer the user the option of using such a device upon industrial high-tech features, including highly advanced medical equipment, as well as on personal equipment intended for private use.

The present invention, in a preferred embodiment, may provide its user with a warning/deterrent signal, reminding the user of the standards and requirements they are committed to, or wish to obtain.

BRIEF DESCRIPTION OF THE DRAWINGS

A detailed description of a preferred embodiment of the present invention will be made with reference to the accompanying drawings.

FIG. 2 illustrates an example of an electro-magnetic radiation sensor somewhat similar to that of FIG. 1, in which an energy saving duty cycle operation is included.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
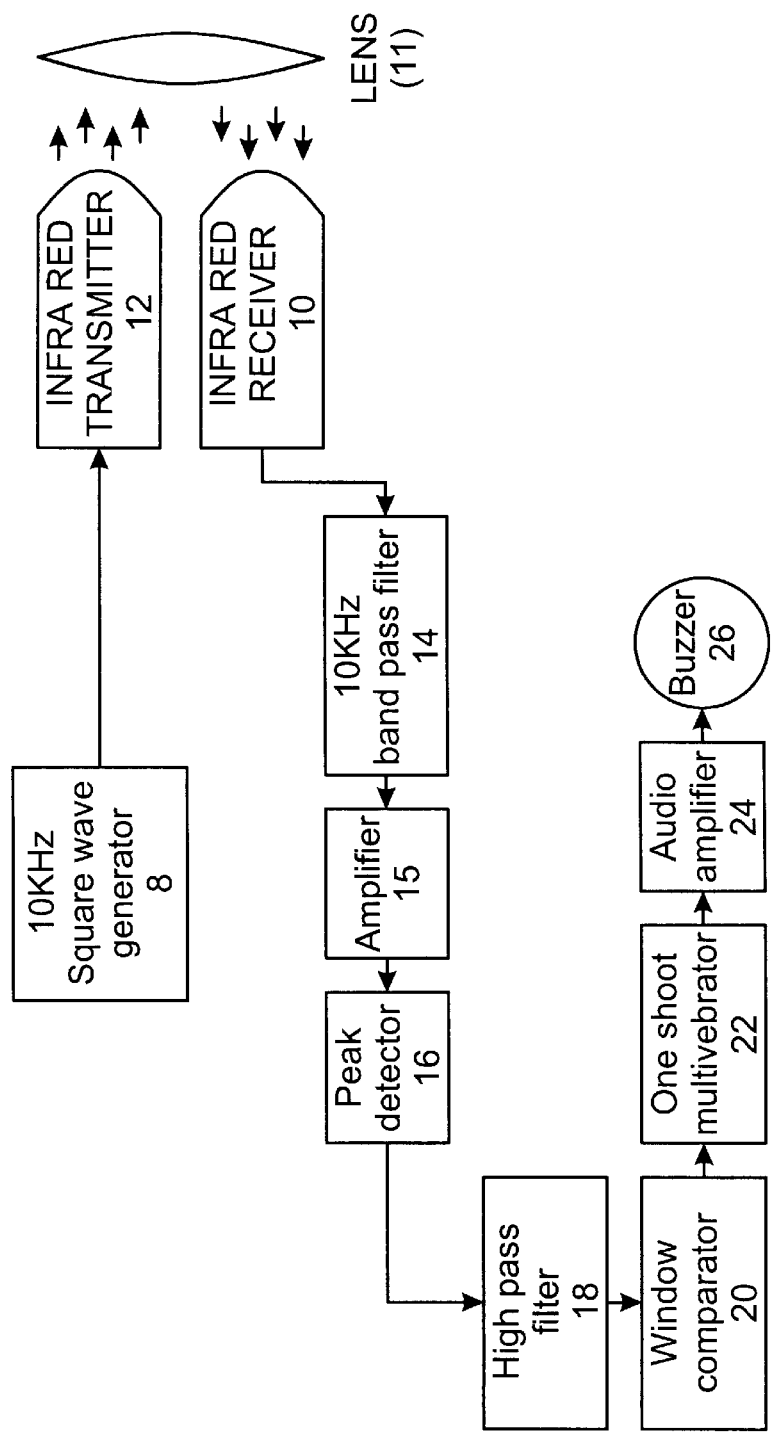
FIG. 1 illustrates an example of an electro-magnetic radiation sensor in accordance with a preferred embodiment of the present invention.

As shown in FIG. 1 with respect to a preferred embodiment, a sensing element may be provided in the form of an infra red receiver 10. The infra red receiver 10 receives infra red light reflected by an object (not shown) through a lens 11. The infra red light originates from an infra red transmitter 12 which is located in proximity to the infra red receiver 10. The infra red transmitter 12 may be in the form of a small LED. The specific type of LED is a matter of design choice.

The infra red transmitter 12 is supplied by a square wave generator 8 which generates modulated light pulses. In a preferred embodiment the infra red transmitter 12 may generate a modulated light pulse at a frequency of ten kHz, although other frequencies are also within the scope of the present invention. The modulation of the light pulse may be useful for a more accurate detection of the receiver 10. The input signal from the receiver 10 may be filtered by a ten kHz band pass filter 14, so that substantially only the transmitted infra red light may be received.

A primary purpose of the illustrated square wave generator (oscillator) 8 is to modulate the infra red transmitter 12 so that the infra red receiver 10 and associated receiving circuit will ignore any other disturbing light pulses. In a preferred embodiment the frequency of the illustrated square wave generator 8 may vary from one kHz up to one hundred kHz. The output current of the illustrated device is preferably about five mA.

The center frequency of the ten kHz band pass filter 14 is preferably the same as that of the square wave generator 8. The filter 14 may be applied by a "Besel" based analog filter. Digital filtering is also possible, since the square wave generator 8 may be used as a reference for mathematical calculations. If a digital filter is applied, then several of the subsequent blocks may be software implemented.

The signal may be amplified to a perceptible level by an amplifier 15. The amplifier 15 preferably has a gain of between about thirty and one hundred fifty, depending largely upon the power of the infra red transmitter 12 and the sensitivity of the infra red receiver 10. However, if a digital filter is applied, then the amplifier 15 may be connected directly to the infra red receiver 10.

The amplified signal may be input to a peak detector 16 that converts the AC amplitude to a DC amplitude. One purpose of the peak detector 16 is to detect the envelope of the modulated infra red reception. It may be applied with a simple diode and an RC net. The rise time of the peak detector 16 is preferably not more then four transmitting cycles, and the fall time is preferably about fifteen cycles.

The DC amplitude may be input to a high pass filter 18. The high pass filter 18 is designed to detect changes over the envelope from the peak detector 16. Movement of an object in front of the infra red receiver 10 will be interpreted as a change over the envelope, which will be detected by the high pass filter 18. Preferably, the pass frequency of the filter is about <0.2 Hz.

The high pass filter 18 may be useful since a device in accordance with a preferred embodiment of the present invention may react substantially only to changes in the received infra red signal (i.e., the device may be designed to be relatively insensitive to conditions of both light or darkness, but may be designed instead to react to the transitions between received levels of light).

The illustrated preferred embodiment includes a window comparator 20. If the output of the high pass filter 18 overshoots or undershoots a specific level, then the output of the window comparator 20 may be activated. The window comparator 20 may be implemented by two comparators (I.M393) with two deferent threshold levels.

The window comparator 20 may output a signal corresponding to a binary "one", for example, when a change in light level exceeds a specified value. If true, a one shot multi vibrator 22 may generate a long enough pulse (approximately two hundred msec) for every "movement detection", so the user can notice that event.

The illustrated preferred embodiment includes an audio amplifier 24. The audio amplifier 24 may generate and buffer an audible wave (approximately 1 kHz/3Vp-p) for each pulse from the one shoot multivibrator 22. A buzzer or speaker 26 connected to the audio amplifier 24 may sound a beep.

Figure 3:
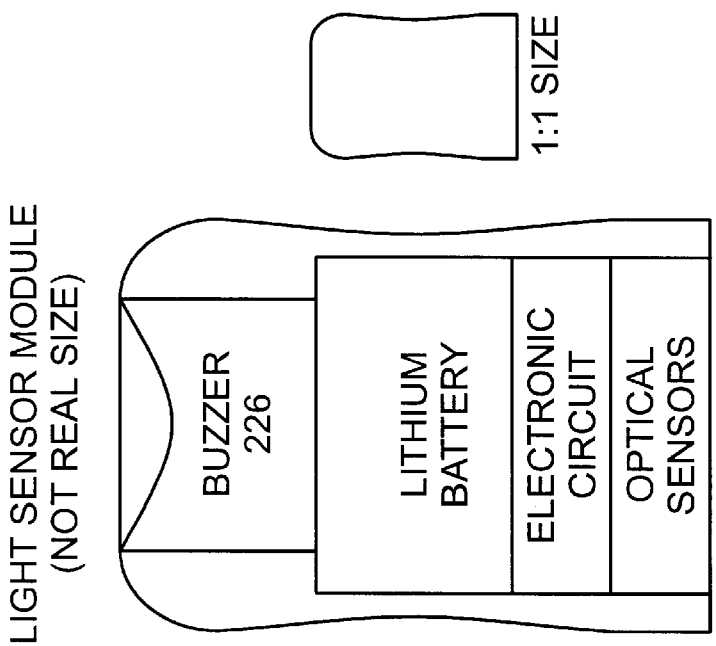
FIG. 3 illustrates, in schematic form, a preferred embodiment of an electro-magnetic radiation sensor in accordance with the present invention.

One example of a preferred embodiment of an electromagnetic radiation sensor in accordance with the present invention is illustrated, in schematic form, in FIG. 3. In this embodiment the entire sensor module is contained within a relatively small housing, with the optical sensors (i.e., the lens and the infra red detector) being located at one end of the housing and the buzzer being located at the other end. A battery and electronic circuitry are located between the buzzer and the optical components.

Figure 4:
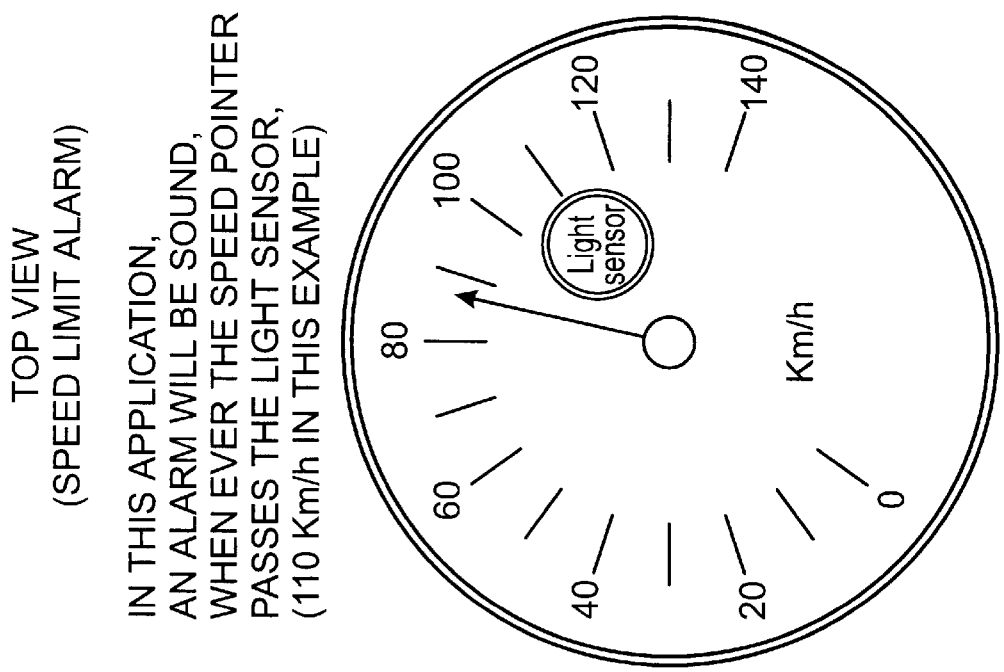
FIG. 4 illustrate an example of how a preferred embodiment of the present invention may be used as a speed limit alarm in an automobile speedometer.

An example of how a preferred embodiment of the present invention may be used as a speed limit alarm in an automobile speedometer is illustrated in FIG. 4.

As shown in FIG. 4, the sensor module is affixed to the glass panel which protects the speedometer. This could be achieved by means of an adhesive placed on the sensor module and/or on the glass panel, by means of magnets placed on the sensor module and/or on the speedometer, or by means of a vacuum suction cup which may be built into the sensor module. Other equivalent means of affixing the sensor module to the speedometer are within the scope of the invention. Indeed, in some cases it may be practical to simply place the sensor module on the glass panel, if the glass panel is going to remain in a substantially stable, horizontal orientation throughout operation of the vehicle. Preferably, the means for affixing the sensor module on the speedometer would enable the sensor module to be easily positioned and repositioned at a wide variety of locations on the glass panel, so that the sensor module could be used and reused at a variety of different settings.

In operation, the sensor module would be affixed to the glass at a position corresponding to a speed limit that the user wished not to exceed. In FIG. 4, for example, the sensor module is affixed to the glass at a position corresponding to a speed limit of approximately 110 Km/h. When the speedometer needle approaches 110 Km/h, and thus approached the vicinity of the sensor module, the infra red light emitted by the infra red transmitter will be reflected by the speedometer needle back toward the infra red light receiver. This will cause the buzzer of the sensor module to emit a noise, thereby warning the user that the selected speed limit has been reached and is about to be exceeded unless some action is taken. The user will thereby have the opportunity to immediately reduce the speed of the vehicle so that the speed limit is not exceeded.

In subsequent operations, the user may want to set the maximum speed limit at a value other than 110 Km/h. The present invention allows this to be accomplished quickly and easily. The user may simply remove the sensor module from its location on the speedometer panel and reposition the sensor module at the new, desired location, where the sensor module may be reaffixed to the speedometer panel for further operation in accordance with the description provided above. The same sensor module may be just as easily used on meters other than speedometers, such as thermostats, electrical gauges, and indeed virtually any meter which provides a visual indicator of a value. The sensor module is preferably sufficiently compact that it can be placed on a wide variety of meters without interfering with the operation of the meters and can be removed and repositioned as desired.

As shown in FIG. 2 with respect to another preferred embodiment of the present invention, to obtain a longer battery life the device may operate in a duty cycle mode. For example, the device may be designed to operate substantially only approximately 1% of the time. The exact value of the duty cycle value may vary, depending upon the operating environment (among other variables). As shown in FIG. 2, wherein like numerals are used to designate corresponding components, the construction of such an energy saving embodiment of the present invention would essentially correspond to that construction illustrated in FIG. 1. The signal from the square wave generator 108 would be directed through a modulator 109 prior to being delivered to the infra red transmitter 112. A signal from a one percent duty cycle square wave generator would be direct to both the modulator 109 and a sample and hold circuit 117, which would be intermediate the peak detector 116 and the high pass filter 118. For example, in one duty cycle mode the infra red transmitter 112 may transmit substantially only on one percent of the time, and the infra red receiver 110 may operate accordingly.

In a preferred embodiment most or all of the elements which comprise the present invention may be integrated in a single, small-sized chip. In another preferred embodiment, most or all of the elements which comprise the invention may be integrated in a single, small-sized chip, except for the optical elements.

In a preferred embodiment a single micro controller chip may be used to perform several functions. These functions may include, for example: (a) generating the timing for the infra red transmitter, (b) performing digital signal processing ("DSP") similar to an algorithm for detecting the desired signal, and (c) generating an appropriate audio signal for the buzzer.

An electro-magnetic radiation sensor warning device in accordance with the present invention can be easily fixed between different switches, thus servicing a number of devices requiring an electro-magnetic radiation sensor warning device. The electro-magnetic radiation sensor warning device may be extremely portable, so that it may be easily planted on or detached from a number of surfaces.

An electro-magnetic radiation sensor warning device may be easily fixed—in a manual manner—so that multi-purpose use (i.e., one device being used for different purposes at different times) may be both feasible, immediate and non-costly. The removal, transfer and attachment of the device from one surface to another surface does not require any technical devices, qualifications or special skills.

The electro-magnetic radiation sensor warning device responds to the need of individual and businesses to comply with speed, light and other limitations imposed by legal and/or other restrictions, thus contributing to the maintenance of safety and legal requirements. Numerous possible advantages may be obtained by using an electro-magnetic radiation sensor warning device in accordance with the present invention. For example, an electro-magnetic radiation sensor warning device in accordance with the present invention may be used to alert and/or inform and/or indicate any change in the speed of a vehicle, or the movement of an object or of a person.

An electro-magnetic radiation sensor warning device can be used in a multi-purpose manner while enjoying minimal size and having a low cost. Most known devices are not externally portable and easily fixable. Instead, most known devices relate to a particular device and are integral to it.

A user of the present invention may be able to connect the external device to the required object or feature by laying it upon such machinery, sticking it to the surface of that machinery, or in certain cases using magnet features built in to the electro-magnetic radiation sensor warning device.

The present invention, in a preferred embodiment, can be operated, adapted and enjoyed by almost all potential consumers, because the device is external and its connection with diverse objects may be very easily performed.

The need for the compatibility of such devices arose out of the realization of the diverse spectrum of needs (of users of such devices) which refer to adhering to speed limits, liquids levels, heat requirements, etc.—all commonly watched, monitored and supervised by private and public bodies. Assisted by the present invention, in a preferred embodiment, such bodies may enjoy an extra significant measure of security.

These highly sophisticated devices may be designed to match the size of an ordinary button, enabling consumers to carry them around with them as well as store a large quantity of the present invention, in a preferred embodiment, making them truly accessible.

The present invention, in a preferred embodiment, may be mass produced from relatively simple, inexpensive components. The present invention, in a preferred embodiment, may be easy to manage, maintain and recharge.

The present invention, in a preferred embodiment, may be activated by a small photoelectric cell which may be connected to a small source of power, which in addition may be able to remind the user by means of sound, light or vibration that the selected limit value has been reached. As mentioned before, the present invention, in a preferred embodiment, is designed as an independent external modular device that provides simple adaptation of portable electro-magnetic radiation sensor warning devices to surfaces of other machinery equipment or materials.

In one preferred embodiment the present invention may comprise a portable, compact, freestanding sensor housing configured to be stably and removably affixed relative to a metering device having a movable indicator element. The housing may include a receiver for receiving radiation, such as electro-magnetic radiation. The receiver may be positioned to define a reflective region within which an object will reflect radiation toward the receiver. In this embodiment, a radiation transmitter is not a required element of the invention, and the radiation which is reflected toward the receiver may be the ambient or environmental radiation (i.e., ambient light). A signal generator, in communication with the receiver, may generate a signal indicating that the movable indicator element is located within the reflective region. A sensor warning device affixed relative to the metering device may thereby generate a signal when the movable indicator element is located within the reflective region.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A light sensor warning device, comprising:

a portable, compact, freestanding sensor housing configured to be stably and removably affixed relative to a metering device having a movable indicator element, the housing comprising:

1) a receiver for receiving light reflected from the movable indicator element, wherein the light comprises ambient or environmental light, 2) the receiver being positioned to define a reflective region within which the movable indicator element will reflect light toward the receiver, 3) a signal generator in communication with the receiver for generating a signal indicating that the movable indicator element is located within the reflective region, 4) a power source for powering at least one of the receiver and the signal generator, whereby the sensor warning device affixed relative to the metering device will generate a warning signal when the movable indicator element is located within the reflective region to indicate that the indicator has reached a predetermined level, and whereby the system does not require a light transmitter.

* * * * *